(12) United States Patent
Robison

(10) Patent No.: US 6,370,685 B1
(45) Date of Patent: Apr. 9, 2002

(54) DATA-FLOW METHOD OF ANALYZING DEFINITIONS AND USES OF L VALUES IN PROGRAMS

(75) Inventor: Arch D. Robison, Champaign, IL (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/226,804

(22) Filed: Jan. 6, 1999

(51) Int. Cl.$^7$ .................................................. G06F 9/45
(52) U.S. Cl. ............................................... 717/8; 717/9
(58) Field of Search ........................................ 717/5–9

(56) References Cited

U.S. PATENT DOCUMENTS

| | | | | |
|---|---|---|---|---|
| 4,843,545 A | * | 6/1989 | Kikuchi ...................... | 395/707 |
| 5,355,494 A | * | 10/1994 | Sistare et al. ............... | 395/706 |
| 5,396,627 A | * | 3/1995 | Iitsuka ....................... | 395/709 |
| 5,448,737 A | * | 9/1995 | Burke et al. ................ | 395/709 |
| 5,481,708 A | * | 1/1996 | Kukol ........................ | 395/709 |

OTHER PUBLICATIONS

DeFouw et al., "Fast interprocedural class analysis", POPL 98, ACM, 1998, pp 222–236.*

* cited by examiner

Primary Examiner—Kakali Chaki
(74) Attorney, Agent, or Firm—Blakely, Sokoloff, Taylor & Zafman LLP

(57) ABSTRACT

A method for analyzing and optimizing programs that contain pointers or aggregates or both, such as found in the languages C, C++, FORTRAN-90, Ada, and Java is disclosed. The program is represented as a control flow graph. The method applies to storage locations (lvalues) computed by instructions in a program. The data flow analysis distinguishes when a definition might reach a use, and if so, whether the expression defining the address of the defined lvalue may have changed. The method ignores changes to the addressing expression where a definition does not reach. The lattice values and functions employed by the analysis are compactly represented as packed bit vectors, and operated upon in a parallel bitwise fashion. Despite the generality of definitions that define lvalues specified by expressions, the present invention computes the reachability of the definitions with a single data-flow framework that requires only one fixed-point solution per data-flow problem.

16 Claims, 16 Drawing Sheets

```
L1:;
p=x[j];
while (p>0) {
    j=j+1;
    p=x[j];
}
q=p;
L2:;
```
FIG. 1A
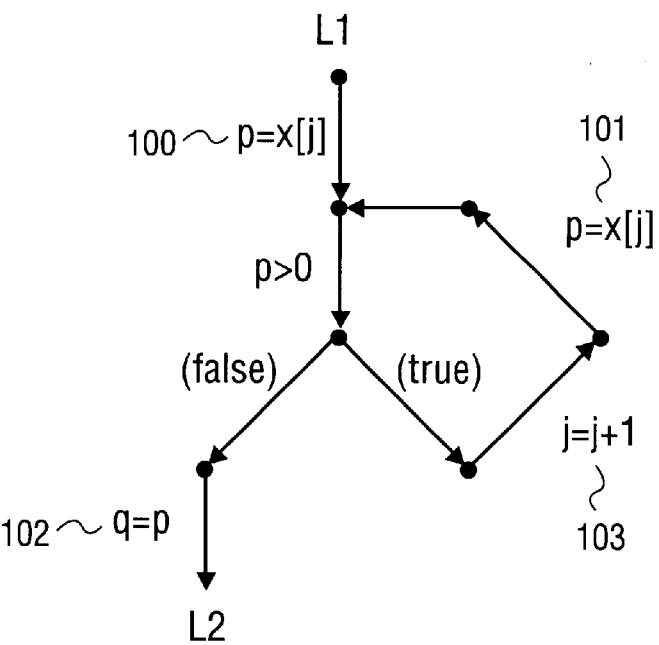
FIG. 1B
```
L1:;
y[k] = 0;
while (p(k)) {
    y[k]=1;
    k=k+1;
}
y[k]=2;
L2:;
```
FIG. 2A
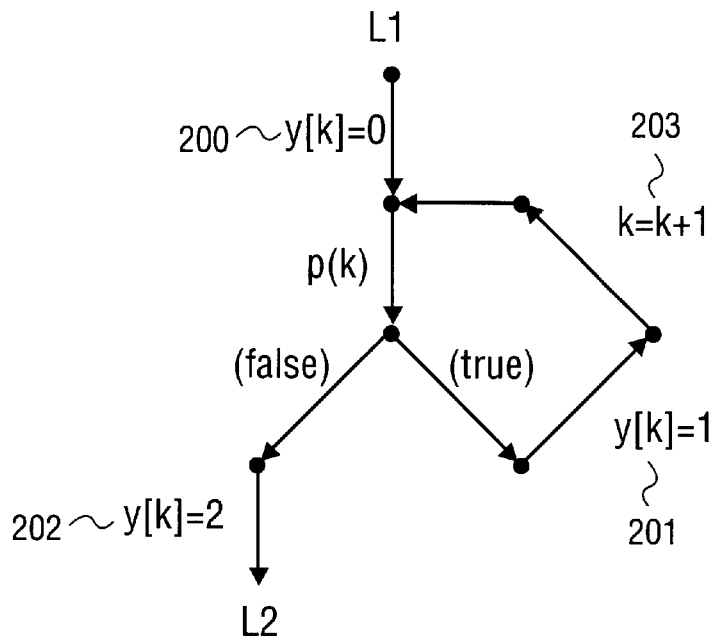
FIG. 2B

```
struct S1 {
    char f1;
    struct {
        struct S2 * f3;
        sruct S2 * f4;
    } f2;
} * v;
struct S2 {
    int f5;
    float f6;
};
```
FIG. 4A
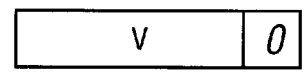
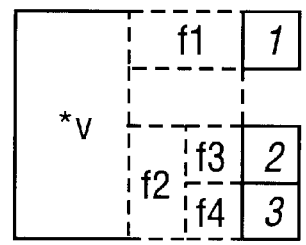
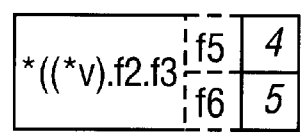
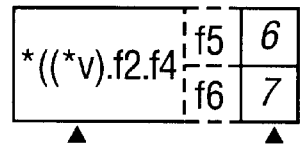
Lvalue    Vector Indices
FIG. 4B

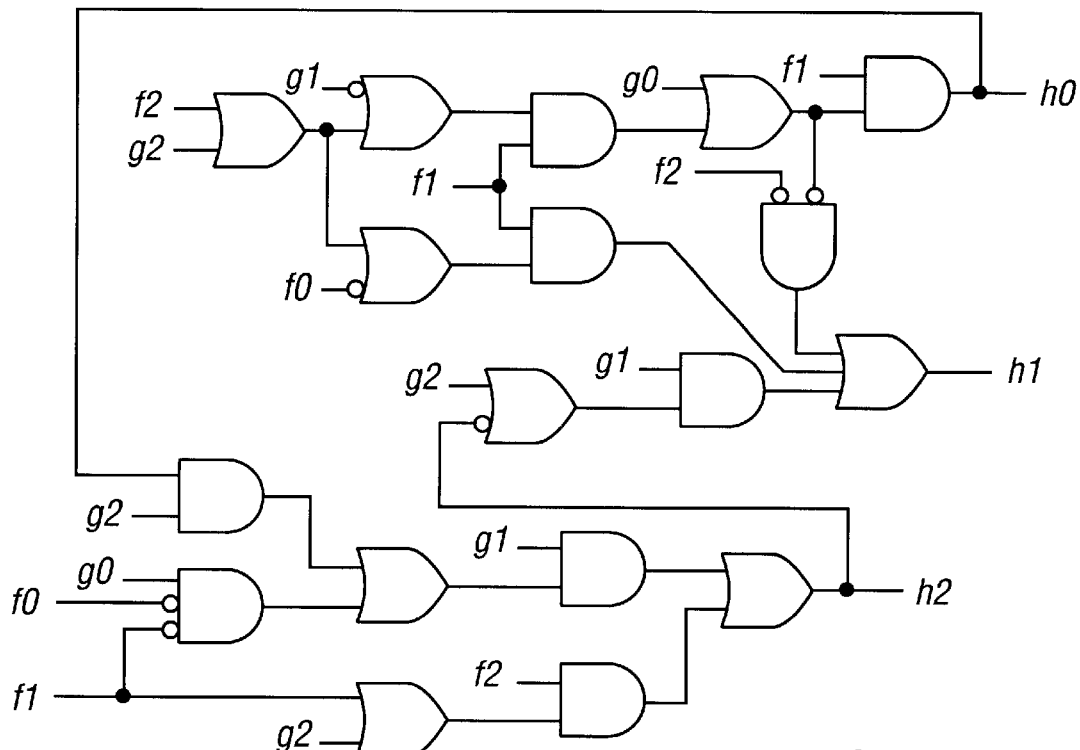
FIG. 12
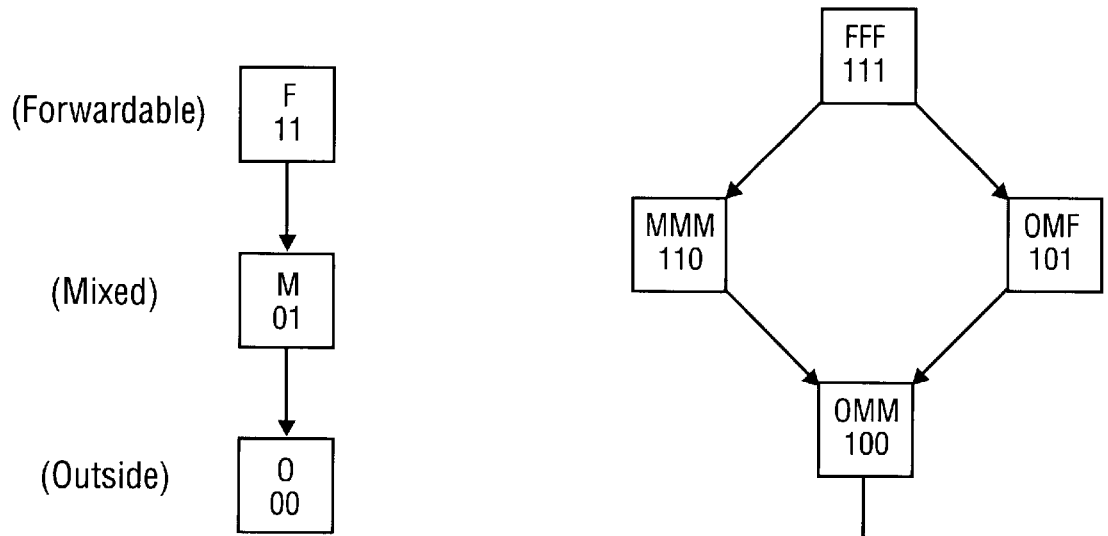
FIG. 13
FIG. 14

DATA-FLOW METHOD OF ANALYZING DEFINITIONS AND USES OF L VALUES IN PROGRAMS

RELATED APPLICATIONS

[Not Applicable]

FEDERALLY SPONSORED RESEARCH OR DEVELOPMENT

[Not Applicable]

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

MICROFICHE APPENDIX

A microfiche appendix of the presently preferred computer program source code is included and comprises 1 sheets and a total of 91 frames.

The Microfiche Appendix is hereby expressly incorporated herein by reference, and contains material which is subject to copyright protection as set forth above.

FIELD OF INVENTION

The present invention generally relates to software compiler technology. More particularly, the present invention relates to a method for computing definition-use information for lvalues that may be aggregates and/or referenced through pointer expressions.

BACKGROUND OF THE INVENTION

Within the field of compilers, the problem of determining which definitions reach uses in a program is important to many optimizations. For the case where the left sides of definitions are scalars, the problem is well understood. One prior-art technique generalizes the analysis to definitions whose left sides are aggregates and/or pointer expressions. The generalization to aggregates is based on partitioning an aggregate into components, and tracking each component separately. The generalization to lvalues referenced through pointer expressions is based on using two data-flow solvers. A bottom level solver tracks whether a pointer expression to the lvalue changes between the point of definition and point of use, and a top level solver employs said information about said changes to determine where the lvalues reach.

This prior art technique has a number of disadvantages.
(a) It requires two data-flow solvers, which can be expensive in time and memory storage requirements. Particularly expensive in terms of space is the requirement that the results of the bottom analyzer be retained while the top analyzer runs.
(b) It requires up to 9 bits of data-flow solution per definition in the data-flow problems solved. Specifically, the bottom-level solver operates on a lattice of 3-bit vectors, and requires two such vectors for each definition analyzed, one for the address of the defined lvalue, and one for the support of the right side. Thus the bottom-level solver requires up to 6 bits per definition to represent a lattice value. The top-level solver requires yet another 3-bit vector value for each partitioned piece of the lvalue defined by the definition. Furthermore, for each bit in any said vector, there are three possible monotone lattice functions, thus two bits are required to represent each lattice function on a bit. Consequently, for a definition partitioned into n pieces, the solvers need 6+3n bits and 12+6n bits respectively to represent the lattice values and functions related to a single definition.
(c) It fails to find some opportunities for forward substitution, because the bottom solver sometimes reports changes in right sides of definitions that were actually irrelevant because the corresponding definition is no longer live along the paths for which the change occurred. FIG. 1A and FIG. 1B show such an example. Definitions 100 and 101 both reach the use 102 of p in "q=p". Both have the form "p=x[j]". The support of x[j] is the set of lvalues {x,j}. If the statement 103 "j=j+1" is executed, then the support of the right side of definition 100 will have changed between its point of definition and the statement "q=p". The prior art interprets the change as preventing forward substitution. However, along paths including "j=j+1", definition 100 is dead, and thus would be correct to forward substitute x[j] for p in "q=p".
(d) It fails to find some opportunities for removing dead stores or scalar replacement, because the bottom solver sometimes reports changes to the support of left sides of definitions that were actually irrelevant because the corresponding definition is no longer live along the paths for which the change occurred. The problem is similar in flavor to said problem with right sides, though the consequent inferiority is different. FIG. 2A and FIG. 2B show such an example. Definition 200 is never used, because it is killed by either definition 201 or 202, depending upon the path taken. The support of the left side of definition 200 includes k, and along paths through definition 201, the value of k changes 203. Unfortunately, when the top-level solver of said prior art inspects definition 202 to check whether it kills definition 200, the bottom-level solver reports that k changed along some paths and consequently the top-level solver must assume that definition 202 does not kill definition 200.

BRIEF SUMMARY OF THE INVENTION

Accordingly, the present invention provides a method and apparatus that analyzes definitions and uses of lvalues in a program. For each definition in the program, the method computes where the definition reaches, and whether the support of the definition's left side has changed while the definition is live. The method according to the present invention can also be implemented by computing where each use reaches backwards within a program, and whether the support of the use changes while the use is live. The present invention also demonstrates a novel way of representing lattice elements with binary codes. The lattice is embedded in a boolean hypercube, and binary codes are assigned corresponding to the hypercube coordinates. The codes are then compacted by removing some bit positions and duplicate codes removed by complementing a few bits in some of the codes.

BRIEF DESCRIPTION OF SEVERAL VIEWS OF THE DRAWINGS

FIG. 1A and FIG. 1B show an example C program and its corresponding flow graph that illustrates a forward-substitution problem in the prior art.

FIG. 2A and FIG. 2B show an example C program and its corresponding flow graph that illustrates a dead-store problem in the prior art.

FIG. 4A and FIG. 4B show sample C declarations and an associated partitioning of lvalues into lvalue chunks.

FIG. 12 shows boolean logic for evaluating the DCA function composition h=fog.

FIG. 13 shows the OMF value lattice.

FIG. 14 shows the OMF function lattice.

DETAILED DESCRIPTION OF THE INVENTION

The following terms have been defined in U.S. Pat. No. 5,790,866 which is assigned to the assignee of the present application and which is incorporated herein by reference: "aggregate", "rvalue", "lvalue", "lvalued-expression", "definition", "support", "SUPPORT", and "TOXIC". The superfluous word "hand" in the terms "left-hand side" and "right-hand side" from U.S. Pat. No. 5,790,866 is omitted herein. The embodiment of the present invention illustrated herein also employs the edge-labeled control-flow graph representation described in U.S. Pat. No. 5,790,866. Said kind of flow graph simplifies minor details of the presentation of the presently preferred embodiments of the present invention.

As used herein, the term "use" means the occurrence of an lvalued expression in a program that denotes the reading (sometimes called loading) of the designated storage location's value.

Here is a brief review of the requisite lattice theory, which should be well known to implementors of data-flow analyzers. A partial ordering is a relation, here denoted by $\leq$, that is transitive, reflexive, and antisymmetric. A lattice is a partial ordering closed under the operations of least upper bound and greatest lower bound. The least upper bound is also called the meet. A function f that maps a lattice of values onto itself is monotone if $x \leq y$ implies $f(x) \leq f(y)$ for any two lattice elements x and y. The set of monotone functions over a lattice of values forms a lattice of functions, where $f \leq g$ if and only if $f(x) \leq f(x)$ for all lattice values x. Such a lattice is called a function lattice. A sublattice of a lattice L is a lattice whose elements are a subset of the elements of L. The operation o denotes function composition; i.e., (fog)(x)=f(g(x)). The notation f* denotes the Kleene closure of f; i.e., the limit of the infinite composition gogogogo . . . , where g is the meet of f and the identity function. The Cartesian product of two functions f and g is a function (f,g) that is defined as (f,g)(x,y)=(f(x),g(y)). The Cartesian product of two lattices L and M is a lattice of all pairs (x,y), where x is an element from L and y is an element from M. The Cartesian product of the set of monotone functions on two lattices is itself a set of monotone functions on the Cartesian product of the lattices.

Figure 3:
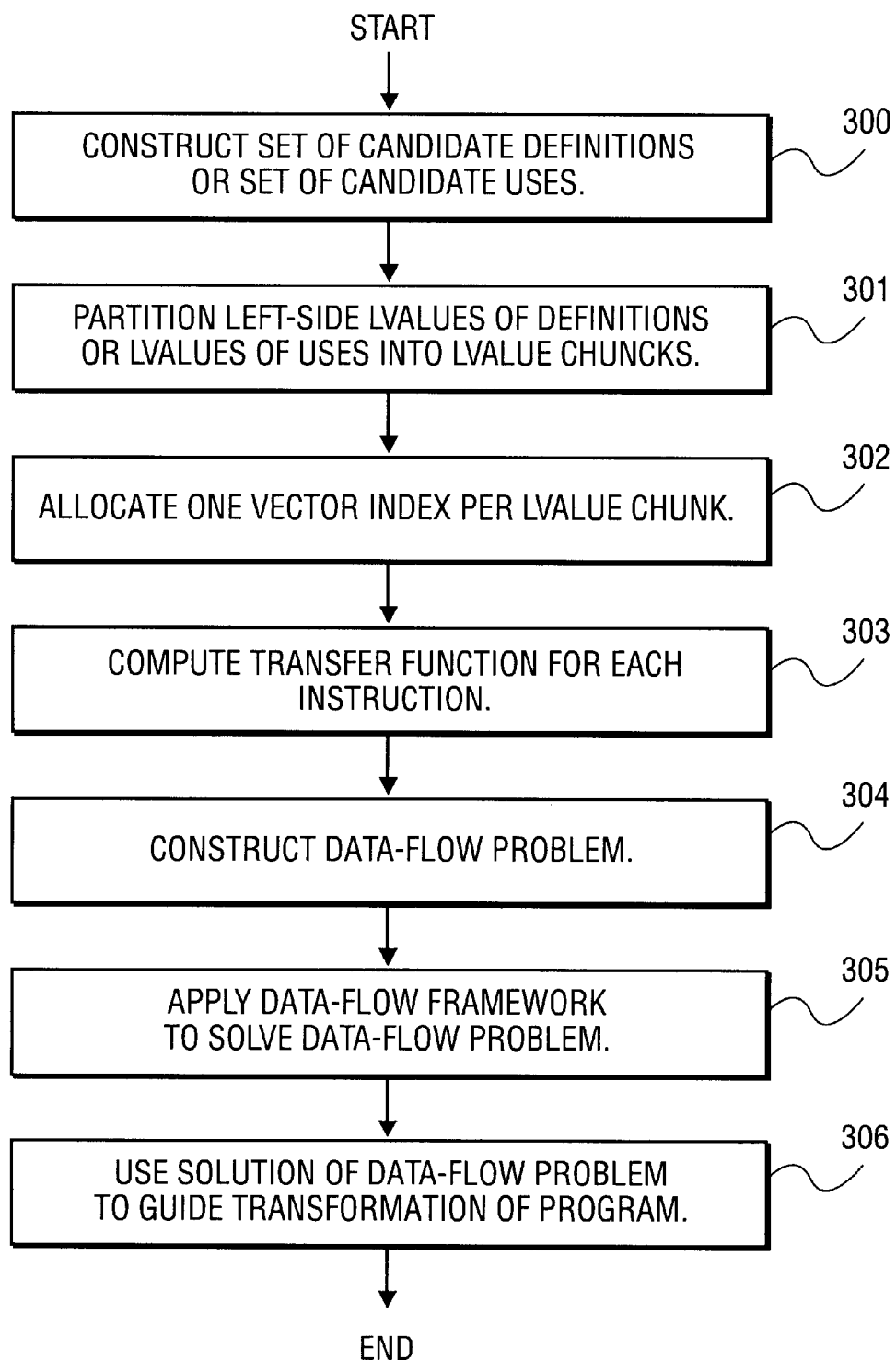
FIG. 3 is a flow chart of the overall operation of a method in accordance with the present invention.

FIG. 3 shows an overview of the steps of a method in accordance with the present invention. A set of candidate definitions or a set of candidate uses is constructed in step 300. The preferred embodiment is to generate a set of candidate definitions and solve a forward data flow problem. An alternative variation is to generate a set of candidate uses and solve a similar backward data flow problem. The rest of this discussion pertains to the forward embodiment until specified otherwise. The left sides of the definitions are partitioned, step 301, into lvalue chunks. Each chunk is tracked separately. Vector indices are allocated at step 302, one per lvalue chunk. Transfer functions are computed at step 303, for each instruction. A data-flow problem is constructed from the transfer functions at step 304. A data-flow framework solves the data-flow problem at step 305. Though the diagram shows the transfer functions being computed eagerly before the data-flow problem is solved, it should be apparent to anyone skilled in the art of data-flow frameworks that the functions can be computed lazily while the data-flow problem is being solved. The eager/lazy tradeoff is similar to that for any other sort of data-flow framework. Finally, the solutions to the flow equations are used at step 306 to guide transformations of the program, such as forward substitution, removing dead stores, scalar replacement, hoisting common subexpresssions etc. The exact transformations are not specified by the method of FIG. 3 as they include any sort of transformation that employs definition-use information. One particular innovation of the illustrated method is the speed and accuracy of the definition-use information, not its application.

FIG. 4A shows a sample declaration of some aggregate types and an lvalue v. FIG. 4B shows a pictorial view of the related lvalues, their partitioning into lvalue chunks, and the indices associated with the lvalue chunks. Notice that lvalues inserted for sake of padding are ignored. For a given definition y, the indices allocated for its chunks is denoted INDICES(LHS(y)). For example, if LHS(y) is (*v).f2, then INDICES(LHS(y))={2,3}. The notation CHUNK[k] denotes the inverse mapping from indices to lvalue chunks. For instance, CHUNK[3] is the lvalue (*v).f2.f4. There is a tradeoff of time and accuracy in choosing the granularity of said partitioning. The recommended level is to partition the lvalues with the coarsest partition such that each definition's left side lvalue is covered by a set of non-overlapping chunks. It is often advantageous to let the partitioning be at bit boundaries rather than merely byte boundaries, when the lvalue chunks are bit fields that are not aligned on byte boundaries.

Data-flow frameworks are based upon value lattices, and functions that map the value lattice onto itself. The functions form a function lattice. The data-flow framework in accordance with the present invention is based on a lattice that is the Cartesian product of two value lattices, called the DCA value lattice and the OMF value lattice. Each of these lattices has an associated function lattice, which is a set of monotone functions from values to values. The set of monotone functions on the Cartesian product of the value lattices is the Cartesian product of the function lattices. From the viewpoint of implementation, this means that the DCA and OMF lattice values and their functions are orthogonal and can be considered separately within the data-flow framework.

FIG. 5, FIG. 6, FIG. 8, FIG. 13, and FIG. 14 show various lattices employed by methods in accordance with the present invention. In each drawing, the lattice elements appear as boxes, which contain the name of the lattice element (if it has a name) and its binary representation. The arrows indicate the partial ordering relation. The relation $x \leq y$ is true if and only if the box for x can be reached from the box for y by traversing zero or more of the arrows from box to box in the direction of the arrows.

Figure 5:
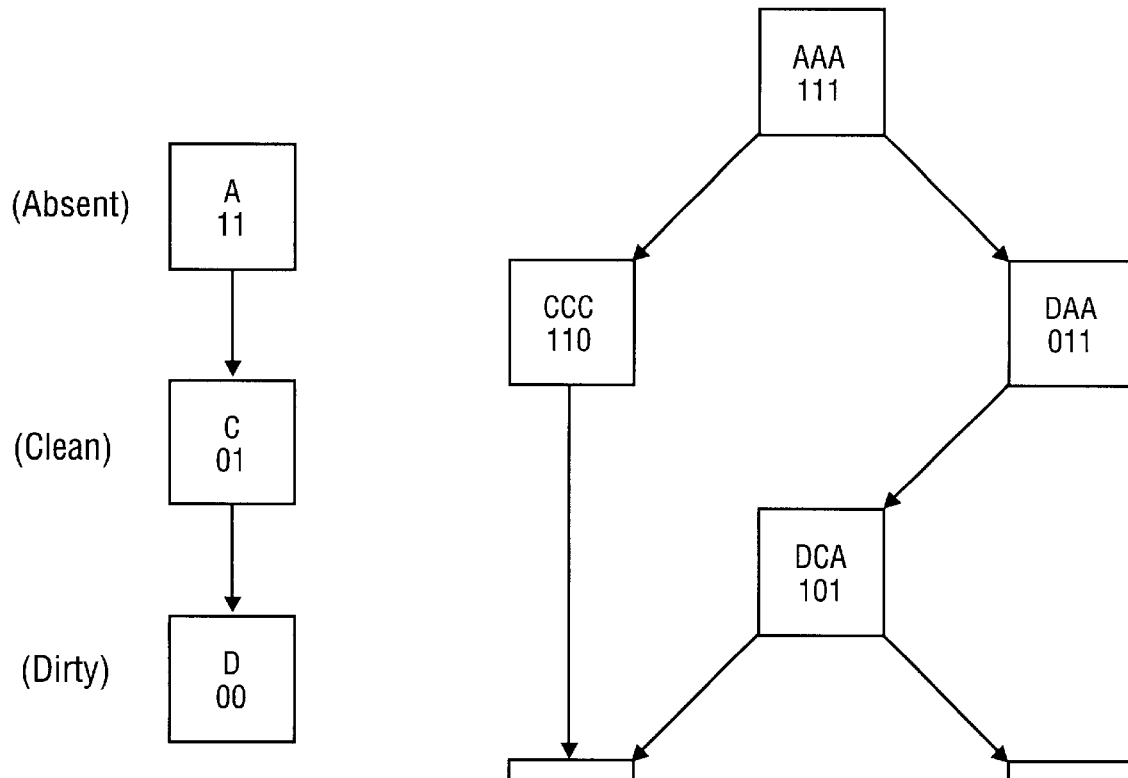
FIG. 5 shows the DCA value lattice.

The DCA value lattice is shown in FIG. 5. The lattice has three elements called D, C, and A. For a given program location, the lattice value A indicates that a definition cannot reach the location. The lattice value C indicates that the definition might reach the location and its left-side support has not changed since the most recent execution of the definition. The lattice value D indicates that the definition might reach the location and its left-side support might have changed since the most recent execution of the definition. For discussion, it is convenient to say a definition is "absent", "clean", or "dirty" at a given program location, depending upon whether the corresponding lattice value is A, C, or D respectively. Absent definitions are often called "dead" or "killed" in the literature. Clean or dirty definitions are often called "live" in the literature. FIG. 5 also shows the 2-bit binary code associated with each element. These codes are used to represent the elements. Other representations are possible, though the representation shown is recommended because it has the useful property that the code for the meet of two DCA elements is the bitwise-AND of their codes.

Figure 6:
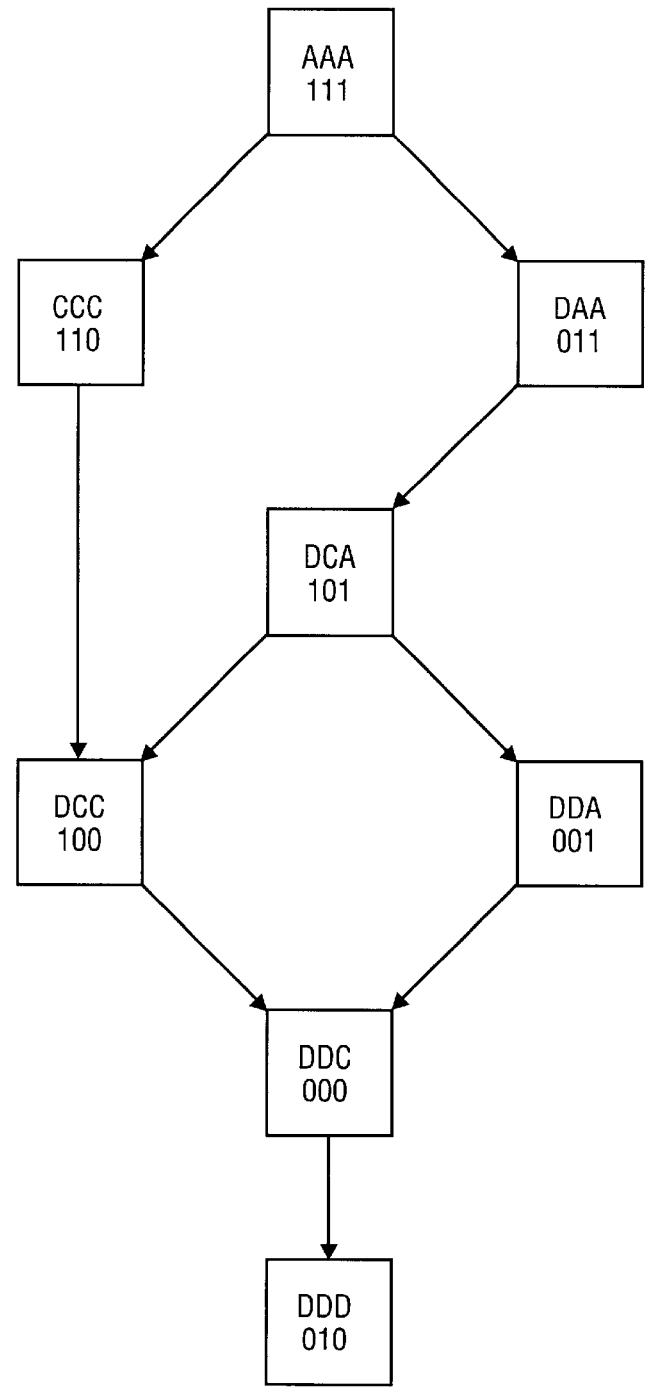
FIG. 6 shows the DCA function lattice.

The DCA function lattice is shown in FIG. 6. Each function f in said lattice is a map from DCA values to DCA values, and has a name of the form xyz, where x=f(D), y=f(C), and z=f(A). For instance, the identity function is named DCA, and the function that always returns D is named DDD. Each DCA function is monotone. The set of DCA functions is closed under composition and meet, thus the functions form a function lattice. Notice that the set of DCA functions is not the set of all ten possible monotone functions on the DCA value lattice. Two possible monotone functions, namely CAA and CCA, are deliberately omitted because they are unnecessary and the omission permits representation of the functions with only 3 bits instead of 4 bits. FIG. 6 also shows how each function on the lattice is encoded as a 3-bit binary numeral.

The encoding of the DCA lattice depends upon the notion of a hypercube lattice. This lattice is well known to those skilled in the art of lattice theory. The relevant details are summarized here. Informally, a hypercube lattice is simply a lattice whose diagram is isomorphic to such a labeled hypercube, hence the name. More formally, each corner of an H-dimensional hypercube can be labeled with an H-bit binary numeral such that there is a hypercube edge between the corners if and only if the corresponding labels differ in exactly one bit position. The lattice elements of a hypercube lattice correspond to said labels on a hypercube. The partial ordering $x \leq y$ on said hypercube lattice is true if and only if the label for y has a 1 in every bit position where the label for x has a 1 in the same position. The meet operation on such a lattice corresponds to taking the bitwise AND of the labels. An H-dimensional hypercube lattice is isomorphic to a "subset lattice", in which each lattice element corresponds to a subset of an H-element set, and the ordering $x \leq y$ is true for said subset lattice if and only if x is a subset of y. The isomorphism is mentioned here because many texts discuss the lattice from the subset viewpoint instead of the hypercube viewpoint. The two viewpoints are mathematically equivalent.

Figure 7:
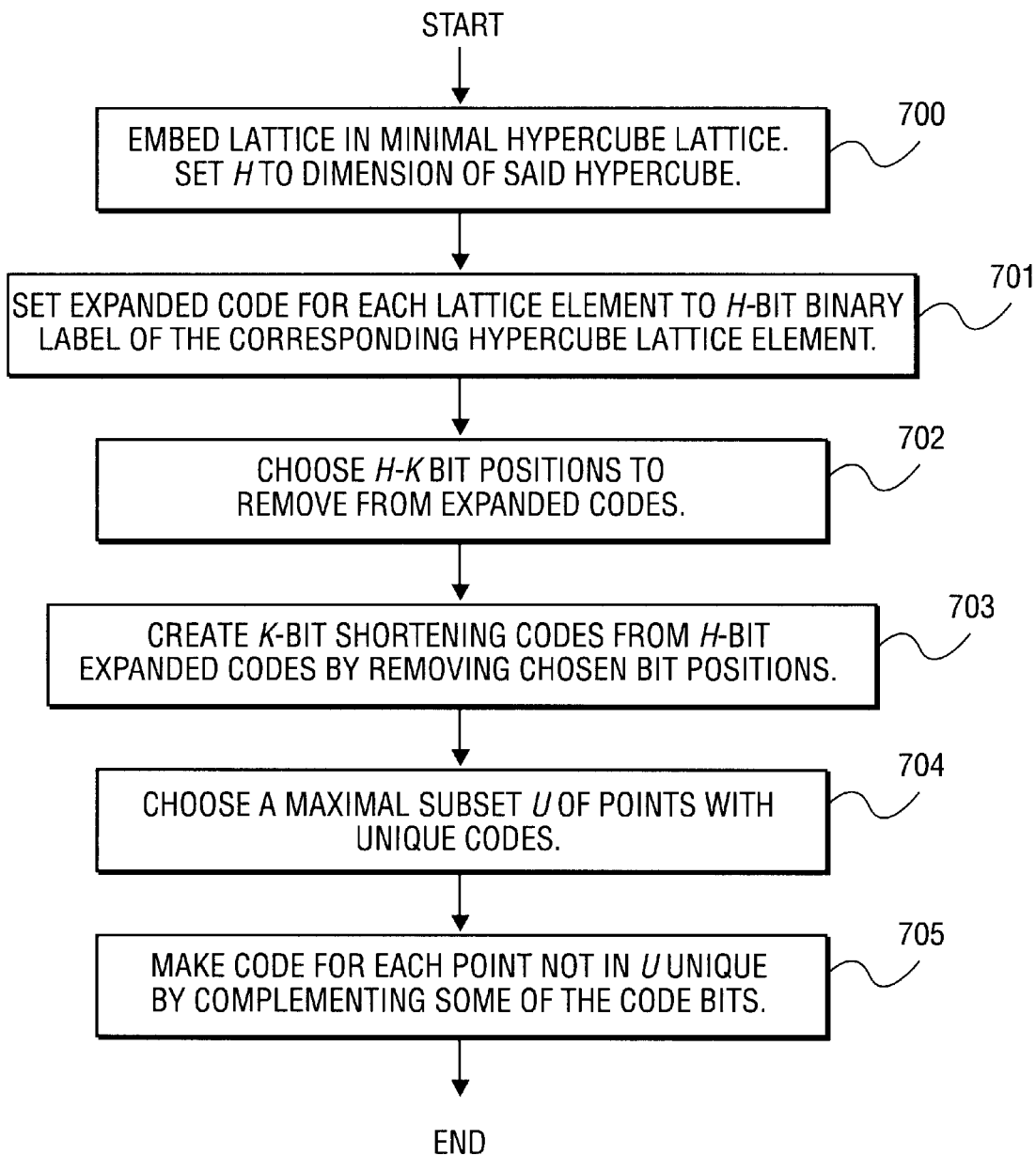
FIG. 7 is a flow chart illustrating a method for encoding a finite lattice.

The codes for the DCA function lattice are chosen to simplify implementation of function composition, function meet, and function application. The codes are based on the following general method shown in FIG. 7 for compressing the representation of elements in a finite lattice to K bits, where K is at least large enough to permit a distinct representation of each element. The lattice is embedded, at step 700, as a minimal sublattice of a hypercube lattice. Minimal means the hypercube lattice of smallest dimension that permits embedding. Step 700 also sets H to the dimension of said hypercube. Such hypercube lattices and embeddings are well known to mathematicians; one novel aspect of the method according to the present invention is in the compaction performed by steps 702–705. Step 701 assigns expanded codes corresponding to the hypercube lattice. More precisely, step 701 sets the expanded code for each lattice element to the H-bit binary label for the element's corresponding corner in the hypercube. Step 702 chooses H–K bit positions to remove from each code. The bit positions must be the same for all codes. The best choice of which bits to remove is most likely those that cause the fewest duplicate codes after step 703. Step 703 shortens the expanded codes by removing the bit position chosen by step 702 from each expanded code. It may be necessary to iterate over the choices allowed by step 702 and do steps 703–705 for each choice, to see which choice is best. Step 704 sets U to a maximal set of elements such that their shortened codes are distinct. An easy way to do this is to start with an empty set, and then for each element, add it to the set if the set does not yet contain an element with the same code. It may be necessary to iterate over the choices allowed by step 704, and do step 705 for each choice, to see which choice is best. Step 705 assigns unique codes to represent the elements of the elements of the lattice. Step 705 does so by looking at each element not in U, and for each such element, complementing bits in it. The best choice of which bits to complement is those that minimize the total number of bits complemented. Another good heuristic is to attempt to minimize the number of positions that involve complementing. The reason is that the meet operation of the lattice elements is the bitwise-AND of their expanded codes, and thus for each position not changed by the reduced code, the corresponding logic for the meet operation is still bitwise AND.

Figure 8:
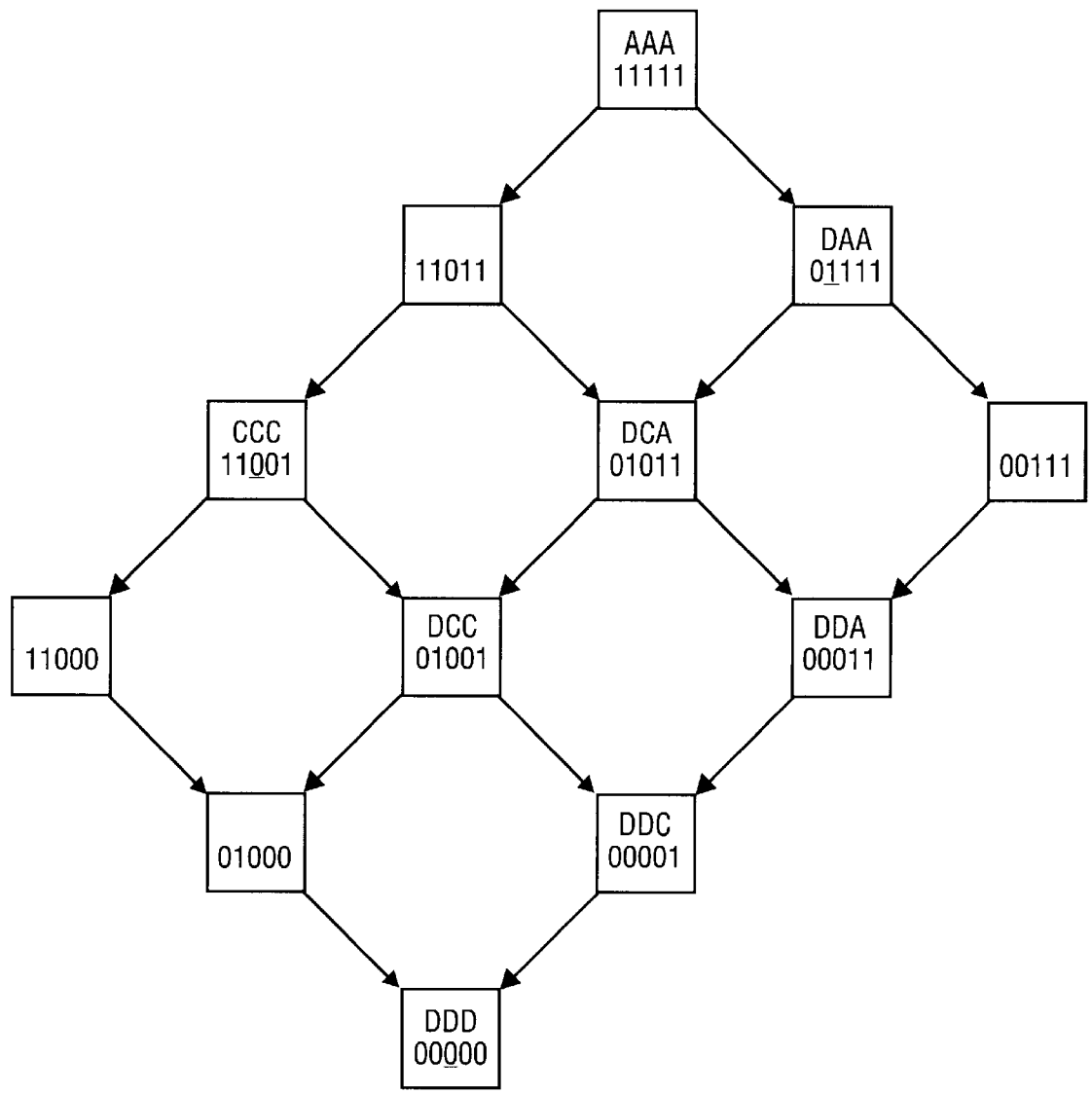
FIG. 8 shows how said encoding method was used to encode the DCA function lattice.

FIG. 8 shows an example where the lattice is the DCA function lattice, with H=5 and K=3. The binary numerals in FIG. 8 are the expanded codes. The complete hypercube has 32 points, though to reduce clutter, only a 12-point subset of interest is shown. The 12 points shown correspond to the minimal sublattice that contains the elements that are DCA functions. The K bits chosen are the middle three bits; i.e. the leftmost and rightmost bits of the 5-bit codes are removed to shorten the codes. The choice was made because it minimized the number of duplicate shortened codes for the DCA lattice elements, before the next step that complements some bits. The underlined bits are those that are complemented to make the reduced codes unique. The choice was guided by the desire to minimize the number of bits complemented and the number of bit positions in which bits needed to be complemented. The shortened 3 -bit codes are shown in FIG. 6. Notice that no flipping is required for the next to rightmost bit of the 5-bit expanded codes in FIG. 8, which corresponds to the rightmost bit of FIG. 6. Thus the corresponding logic for the bit when computing the meet of two DCA functions is simply an AND operation (output h0 of FIG. 11).

Figure 9:
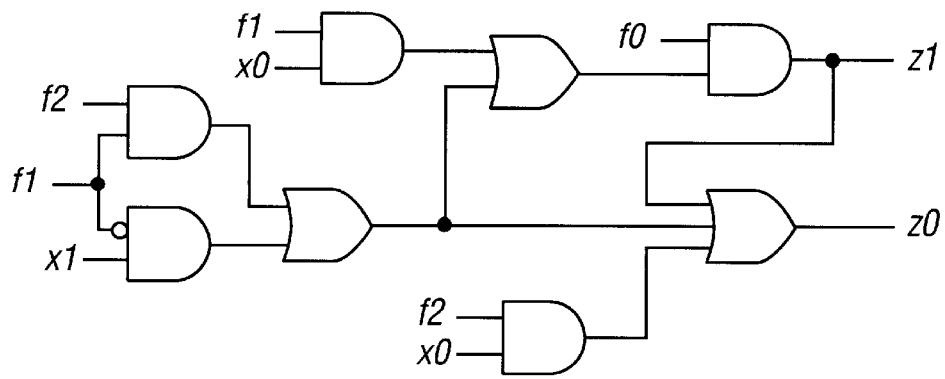
FIG. 9 shows boolean logic for evaluating the DCA function application y=f(x).
Figure 10:
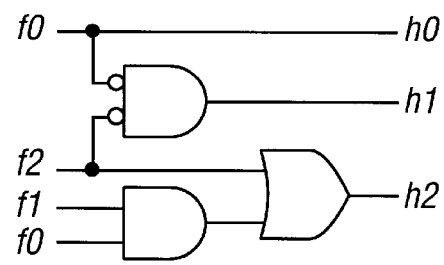
FIG. 10 shows boolean logic for evaluating the DCA Kleene closure h=f*.
Figure 11:
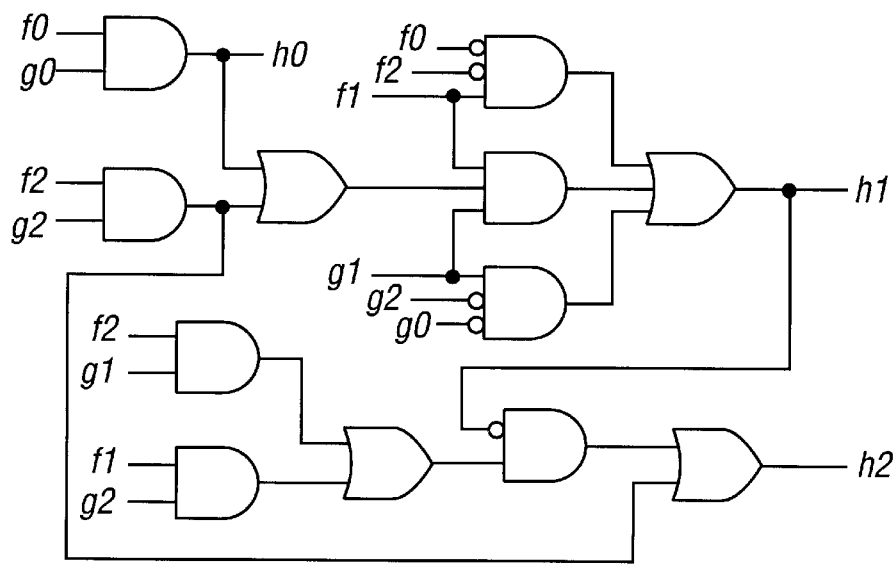
FIG. 11 shows boolean logic for evaluating the DCA function h that is the meet of DCA functions f and g.

FIG. 9 shows logic suitable for computing function application z:=f(x) for a DCA function f to a DCA value x, where the binary code for input f is f2 f1 f0, and the binary codes for input x and output z are x1 x0 and z1 z0 respectively. FIG. 10 shows logic suitable for computing the Kleene closure h with binary representation h2 h1 h0 of a DCA function f with binary representation f2 f1 f0. FIG. 11 shows logic suitable for computing the meet h of two functions f and g in the DCA function lattice, where the binary codes for h, f, and g, are respectively h2 h1 h0, f2 f1 f0, and g2 g1 g0. FIG. 12 shows logic suitable for computing the composition h of two functions f and g, where the binary codes are likewise.

The diagrams of FIGS. 9–12 are presented in the form of traditional hardware diagrams to convey the notion that the logic can be implemented with straight-line code that performs bitwise boolean operations. The implementor can think of them as parse graphs of expressions for the operations. Alternative embodiments are table lookup and explicit programming using a sequence of decisions; e.g., if-then-else statements. The bitwise approach is preferred, because the logic can be executed in parallel for many values or functions. For example, on a 64-bit machine, 64 different function compositions can be computed simultaneously at a cost of less than one machine operation per composition. There is also a tradeoff between compactness of the encoding and complexity of the logic. For instance, using 5-bit expanded codes simplifies computation of function meet, at the expense of memory storage requirements. Codes of intermediate length or redundancy are also possible.

The OMF value lattice is shown in FIG. 13. The lattice has three elements called O, M, and F. For a given program location, the lattice value F indicates a definition can be forward-substituted at the location. The lattice value M indicates that a definition cannot be forward-substituted at the location but is not corrupted by part of the program that is not a definition. The lattice value O indicates that the definition is corrupted by part of the program that is not a definition. For discussion it is convenient to say that a definition is "forwardable", "mixed", or "outside" at a location, depending upon whether the corresponding lattice value is F, M or O respectively. The distinction between M and O is important, because in case M, we know that the definition-use information provided by the DCA lattice describes entirely how an lvalue is defined. The OMF value lattice is isomorphic to the DCA lattice; hence its binary encoding is isomorphic.

The OMF function lattice is shown in FIG. 14. Each function f in said lattice has a name of the form xyz, where x=f(O), y=f(M), and z=f(F). A handy mnemonic is that both the DCA and OMF function lattices are named for their respective identity functions. Each OMF function is monotone. The set of OMF functions is closed under composition and meet. FIG. 14 also shows the 3-bit binary code associated with each function. The codes are based on the observation that the OMF function lattice is isomorphic to a sublattice of the DCA function lattice. The logic used to compute various operations on OMF functions and values can be the same logic as for DCA functions and values, permitting a "shared logic" implementation. This is advantageous to implementors because, for instance, bitwise operations on a 64-bit machine can compute 32 separate DCA function compositions and 32 separate OMF function compositions, all simultaneously.

Figure 15:
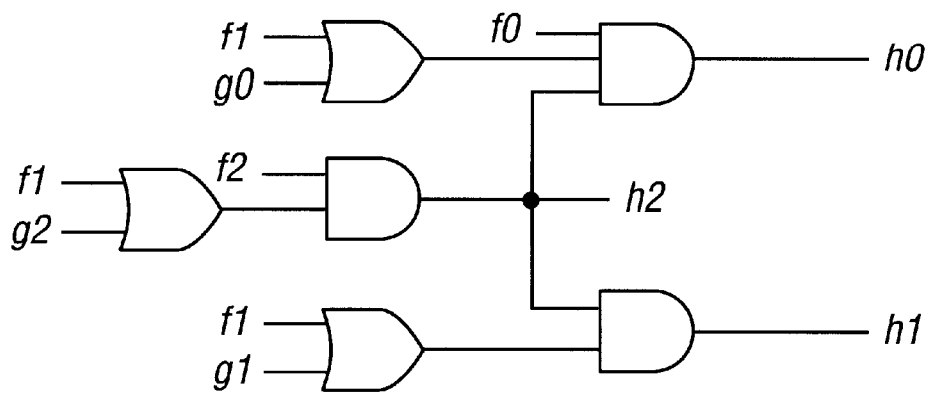
FIG. 15 shows boolean logic for evaluating the OMF function composition h=fog.
Figure 16:
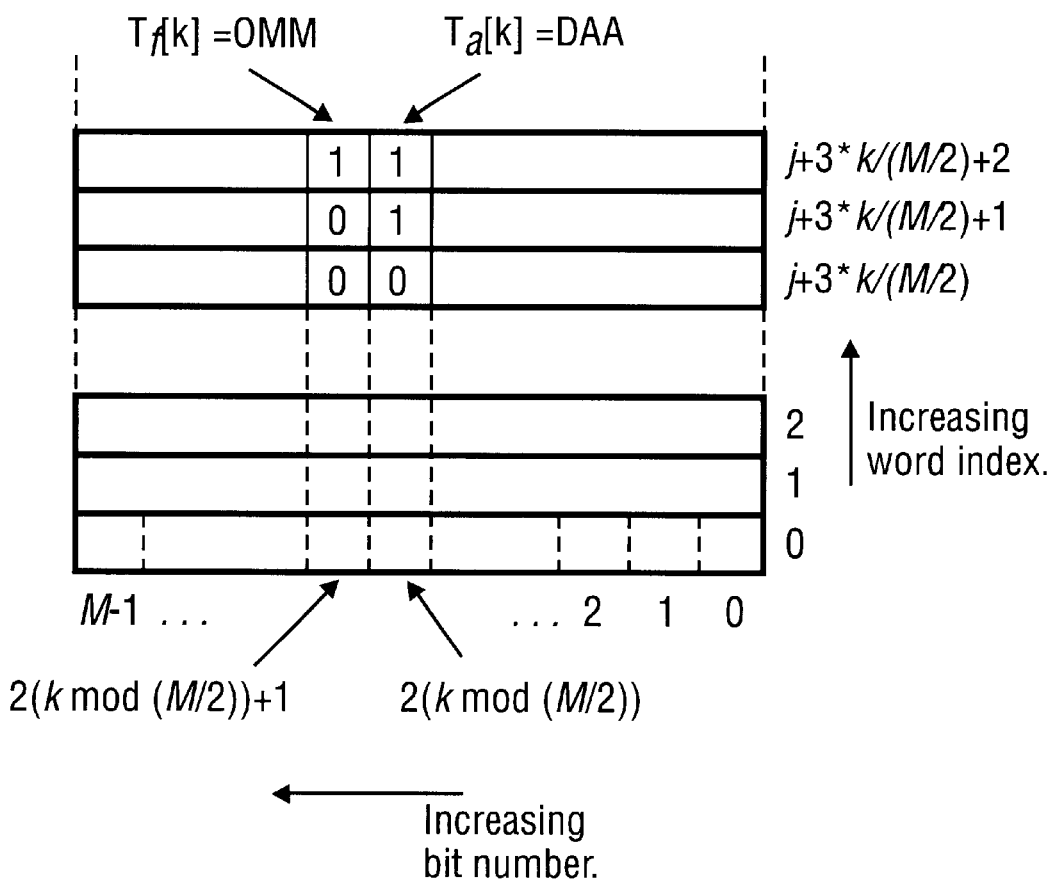
FIG. 16 shows the recommended packing of bits in memory when using the "shared logic" approach to doing operations on DCA and OMF entities.

Alternatively, implementors may want to exploit the fact that the OMF function lattice has three fewer functions than the DCA lattice, and consequently the boolean logic can be simplified by exploiting the resulting "don't care" states in the logic equations. For example, FIG. 15 shows the resulting simplified logic corresponding to FIG. 12 (function composition), which demonstrates the significant savings that may be obtained. The art of deriving such simplification is well known to computer designers, hence simplification of FIG. 9, FIG. 10, and FIG. 11 for the OMF function lattice are left to the implementor. The simplifications sometimes help, because there are fewer operations for the flow analyzer to execute; they sometimes hinder, because they prevent sharing of bitwise operations for both DCA and OMF logic. To make the best choice, the implementor should consider the typical number of lvalue chunks that are of simultaneous interest, say N, and the word size of the host machine's bitwise boolean operations, say M bits. When N does not exceed M/2, the shared implementation is superior, as the OMF calculation can be done "for free" while the DCA calculation is done. When N exceeds M/2, the simplified form may be quicker. However, if the limiting resource of the host computer is memory bandwidth and not the bitwise operations, then the simplified form might not help, since the number of inputs and outputs is still the same. A hybrid alternative is to implement both forms, and dynamically decide during analysis which to use on a case-by-case basis.

An important key component of a data-flow framework is the computation of transfer functions corresponding to each instruction in a flow graph. The total number of lvalue chunks in a given flow problem is henceforth denoted by N. The chunks are numbered 0 through N–1. The transfer function for an instruction is the Cartesian product of two functions $T_f$ and $T_a$. The function $T_f$ is an OMF lattice function and the function $T_a$ is a DCA lattice function. Each function maps knowledge about the program's state before said instruction is executed to knowledge about the program's state after said instruction is executed. The functions $T_f$ and $T_a$ for each instruction are conceptually represented as N-element arrays of values of the OMF and DCA kind respectively. The notations $T_f[k]$ and $T_a[k]$ denote the kth element of the respective arrays. Physically, the best way to implement the arrays is in a "slicewise" packing with six bit vectors, because said packing permits evaluation of many lattice operations in parallel by using bitwise boolean operations on words of bits. An alternative is to use unpacked arrays with one lattice element per array element, though this approach makes parallel evaluation of many lattice operations less practical unless the hardware running the analyzer has suitable vector instructions.

The slicewise packing is as follows. For j in {0,1,2}, the jth bit of $T_f[k]$ is the kth bit within the (j+3)th bit-vector, and the jth bit of $T_a$ is the kth bit within the jth bit-vector, so that said bitwise boolean operations may be employed. If the vectors require more than one word, it is best to interlace the vectors so word i of the jth vector is the (6i+j)th word in memory.

In the "shared logic" implementation, the encodings of values for the two lattices share the same words of storage, the encodings of the functions for the two lattices share the same words of storage, and the operations on the two lattices share the same bitwise boolean operations. To do this, the arrays $T_f$ and $T_a$ are packed into three bit vectors such that the jth bit of $T_f[k]$ and jth bit of $T_a[k]$ are the (2k)th bit and (2k+1)th bit within the jth bit vector, the vectors are word-wise interlaced such that word i of the jth vector is the (3i+j)th word in memory. FIG .16 shows the recommended packing of words for said "shared logic" implementation. DCA lattice values and DCA lattice functions are packed similarly, except that since each value requires only two bits, only two bit vectors are required. Since the OMF function lattice is a sublattice of the DCA function sublattice, the bitwise boolean operations for implementing the lattice operations on both lattices simultaneously are those for evaluating the corresponding DCA operations shown in FIG. 9–FIG. 12.

Figure 17:
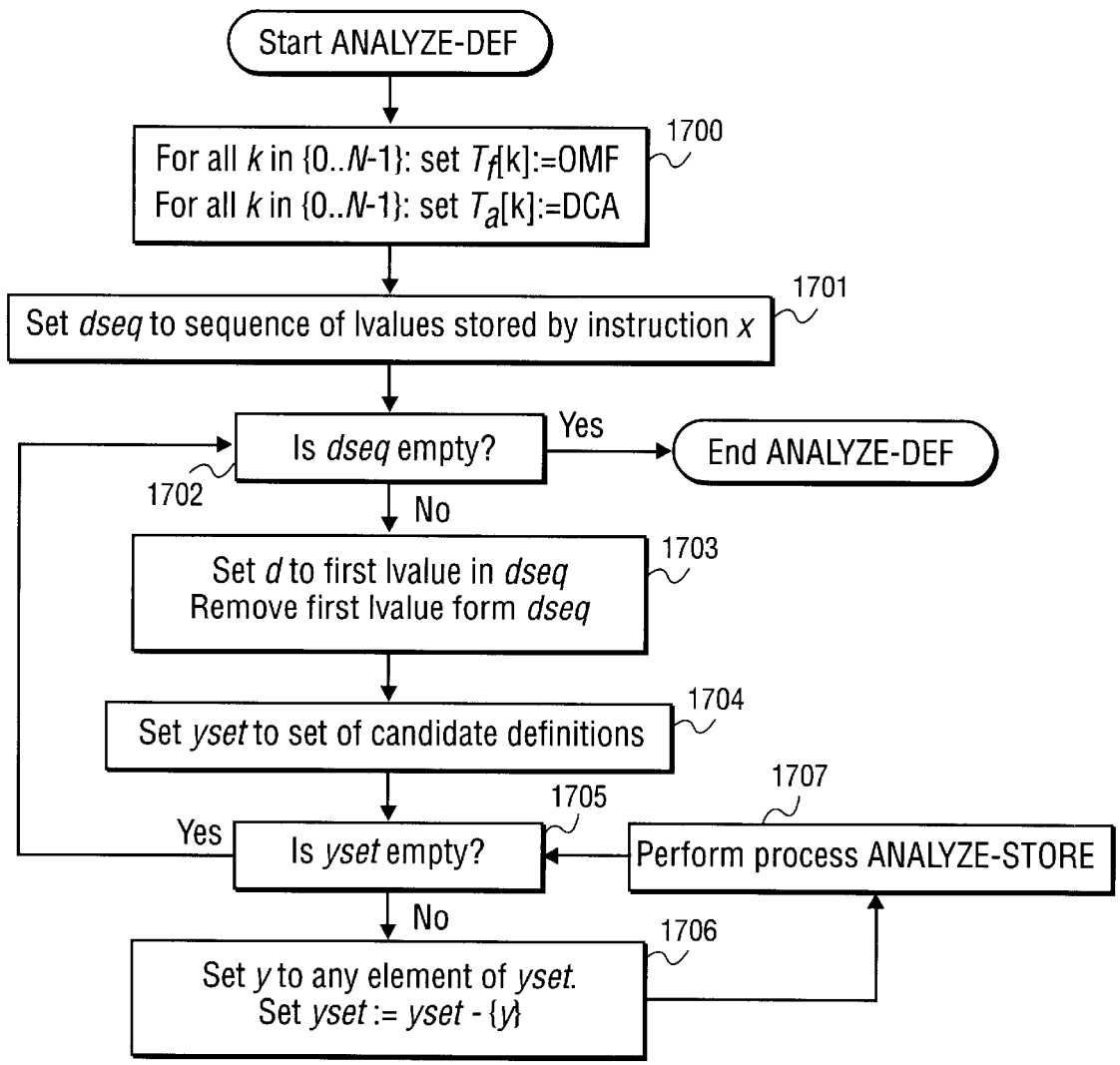
FIG. 17 is a flow chart of process ANALYZE-DEF, which analyzes the effects of an instruction on candidate definitions.

FIG. 17 shows a method illustrating the process ANALYZE-DEF for computing transfer functions $T_f$ and $T_a$ corresponding to an instruction x. Process ANALYZE-DEF is called when the transfer function for each instruction needs to be computed (step 303 of FIG. 3). Its operation is as follows. Step 1700 sets all elements of $T_f$ and $T_a$ to the respective identity functions of the OMF and DCA lattices. Step 1701 sets sequence dseq to the sequence of lvalues stored by instruction x. If an instruction conditionally stores into an lvalue, the lvalue is included in sequence dseq. The rest of the steps remove each lvalue from dseq in turn and analyze it. Step 1702 checks whether dseq is empty, and if not empty, step 1703 removes the first lvalue d from dseq. Step 1704 assigns to set yset the set of candidate definitions (from step 300 in FIG. 3.) The rest of the steps remove each definition from yset and in turn and analyze the effect on it by the store to lvalue d. Step 1705 checks whether yset is empty, and if not empty, step 1706 removes any definition y from yset, and step 1707 invokes process ANALYZE-STORE. Process ANALYZE-STORE is described in detail in conjunction with FIG. 18.

The accuracy of the method in accordance with the present invention is enhanced by the notion of "toxic" stores into memory. U.S. Pat. No. 5,790,866 discusses the notion of "toxic" in more detail and is incorporated herein by reference. The predicate TOXIC(L,R) is true if the analyzer is permitted to ignore the effect of a store of an rvalue R on subsequent evaluations of an lvalue L. For example, the program being analyzed may be known to never store a floating-point value into memory and read the value back as a pointer. In this case, given any pointer lvalue L and floating-point value R, the predicate TOXIC(L,R) would be true.

Figure 18:
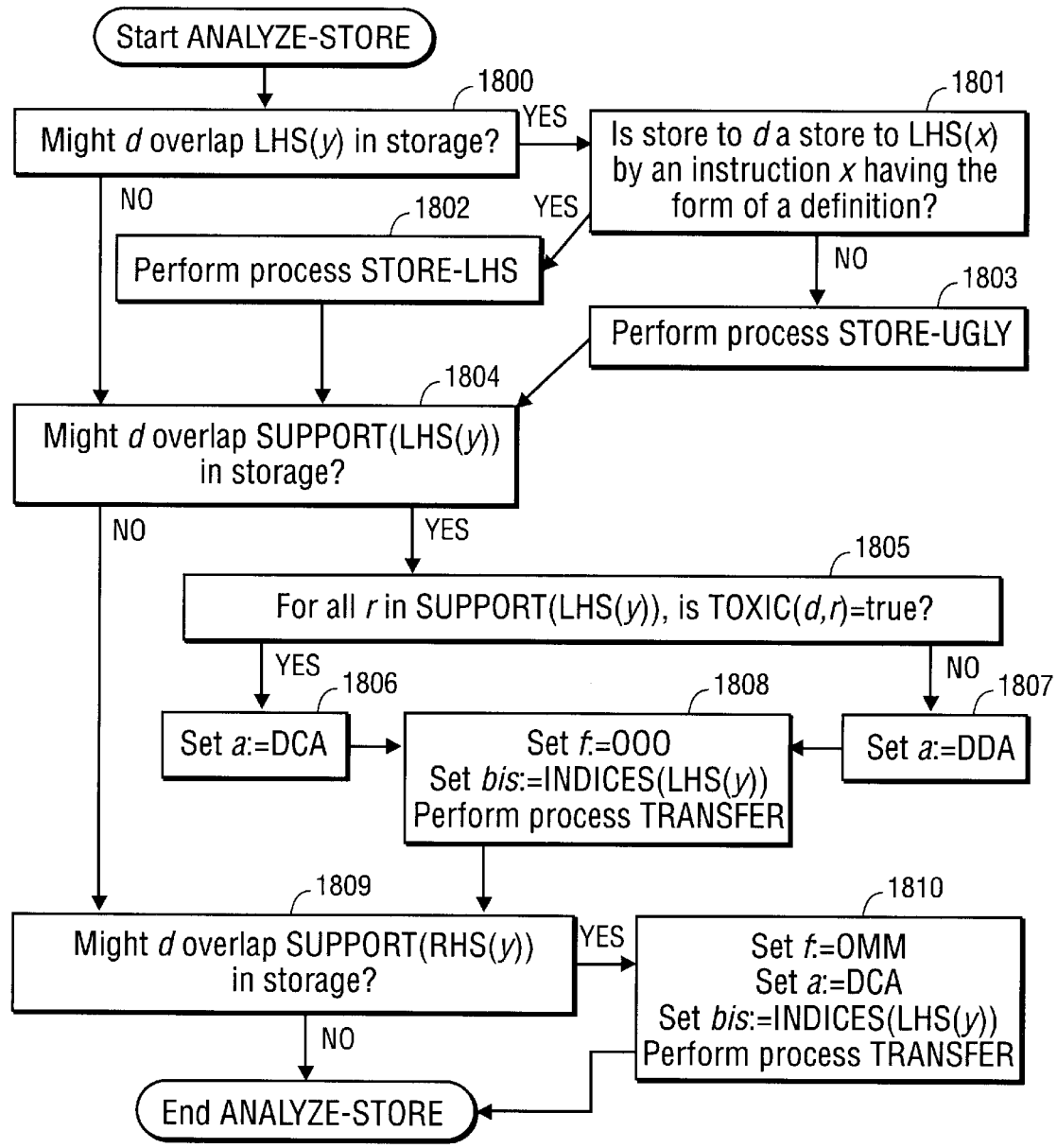
FIG. 18 is a flow chart of process ANALYZE-STORE, which is a subprocess of ANALYZE-DEF.

FIG. 18 shows a method illustrating process ANALYZE-STORE, which analyzes the effects of a store to lvalue d to a definition y. Its basic operation is to inspect effects of the store, and accordingly set function-valued variables f and a to the appropriate transfer functions from the OMF and DCA function lattices respectively, and invoke process TRANSFER to apply said functions to the desired elements of $T_f$ and $T_a$. The desired elements are specified by the indices within set-valued variable bis. Three classes of effects are considered: effects on the lvalue defined by y, effects on the support of the left side of y, and effects on the support of the right side of y. The left side and right side of definition y are respectively denoted LHS(y) and RHS(y). The order of inspecting these three classes of effects is important. For instance, if definition y were "j=j+1", and effects on the support of the right side were handled before effects on the defined lvalue, contrary to the order shown, then the definition would be analyzed as "forwardable", when in fact it is not. Steps 1800, 1804, and 1809 depend upon the well-known art of alias analysis to determine whether lvalues overlap. The implementation and quality of alias analysis are not part of the present invention, though the quality will affect the accuracy of the present invention. The detailed operation of ANALYZE-STORE follows. Step 1800 tests if lvalue d might overlap the lvalue stored by y. If so, step 1801 checks whether the store to d is the store to LHS(x) by an instruction x having the form of a definition, even if the instruction is not a candidate definition. If so, then step 1802 invokes process STORE-LHS to analyze the store in detail. Process STORE-LHS is described in conjunction with FIG. 19. Otherwise step 1803 invokes process STORE-UGLY. Process STORE-UGLY is described in detail in conjunction with FIG. 20. Step 1804 tests whether the store to d might change the support of the left side of y. If so, step 1805 checks if for all rvalues r in SUPPORT(LHS(y)), the predicate TOXIC(d,r) is true. If always so, then step 1806 sets variable a to DCA. If sometimes not, then step 1807 sets variable a to DDA. In either case, step 1808 sets variable f to OOO, sets variable bis to INDICES(LHS(y)), and invokes process TRANSFER. Process TRANSFER is described in detail in connection with FIG. 21. This completes accounting for effects to the left side of y. Step 1809 tests whether the store to d might change the support of the right side of y. If so, step 1810 sets variable f to OMM, set variable a to DCA, set variable bis to INDICES(LHS(y)), and invoke process TRANSFER.

The loop structure in FIG. 17 and checks for overlap in FIG. 18 are shown as independent. It should be apparent to those skilled in the art of database design that the loop and checks are searching a database for records with certain attributes, namely various forms of overlap. Therefore clever data structures that fetch only those combinations of a definition y and lvalue d of non-trivial interest may greatly speed up operation of the present invention. Design of said clever database is not part of the present invention.

Figure 19:
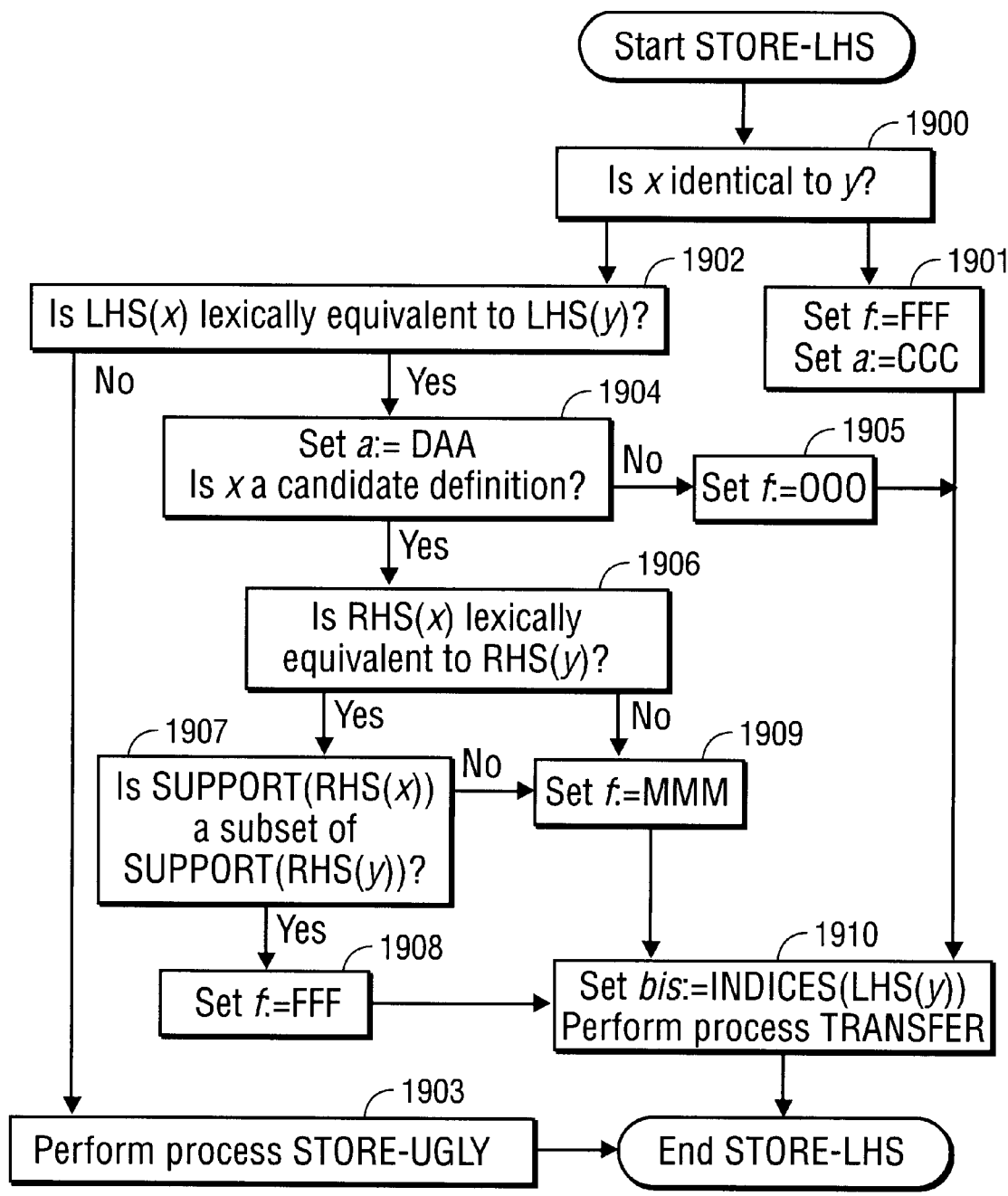
FIG. 19 is a flow chart of process STORE-LHS, which is a subprocess of process ANALYZE-STORE.
Figure 20:
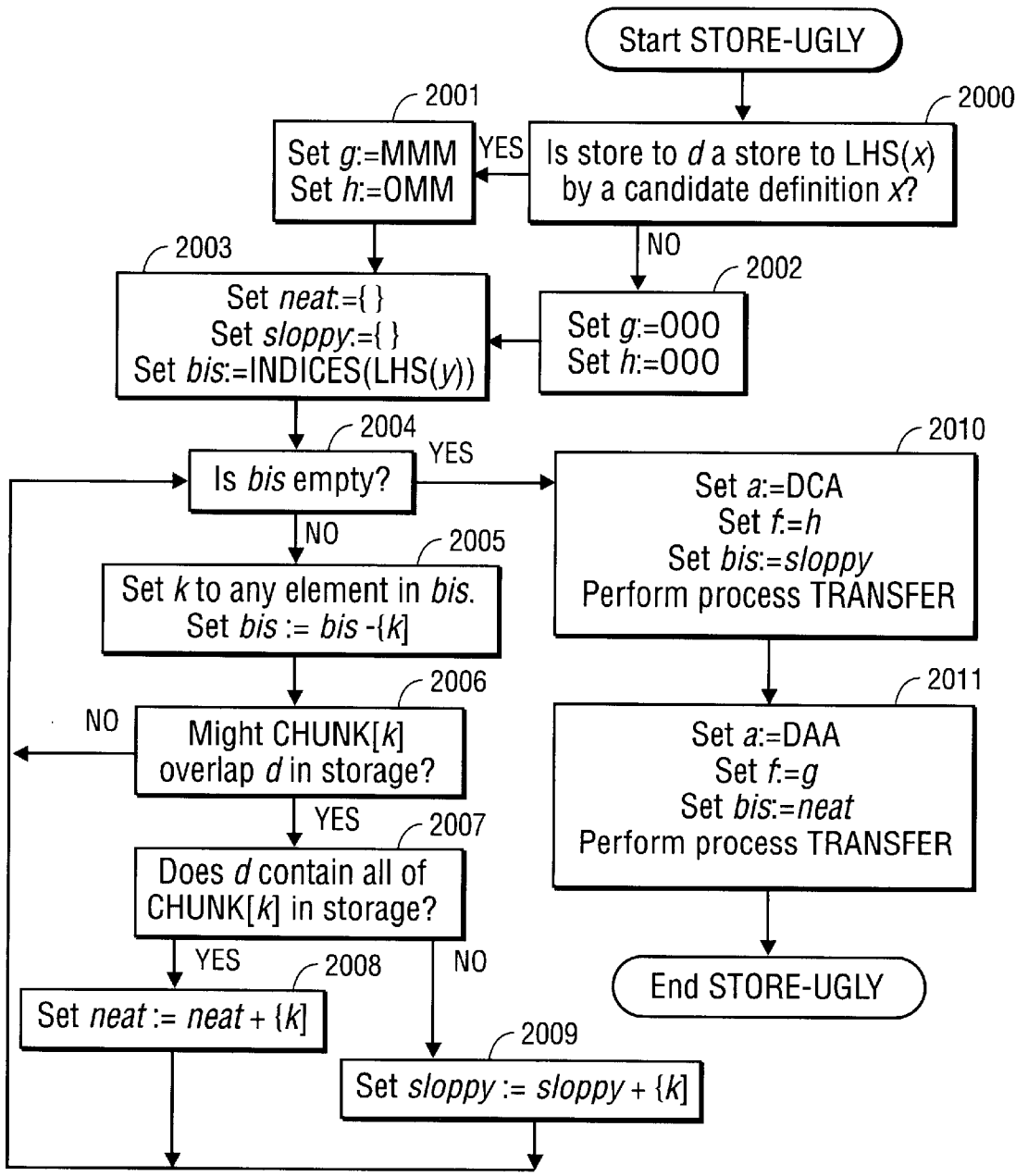
FIG. 20 is a flow chart of process STORE-UGLY, which is a subprocess of processes ANALYZE-STORE and STORE-LHS.

FIG. 19 is a flow diagram illustrating process STORE-LHS, which analyzes the effects on a candidate definition y of a store by an instruction x that has the form of a definition, even if it is not in the set of candidate definitions (constructed in step 300 of FIG. 3). Step 1900 checks whether instruction x is identical to y, i.e. is the definition itself. If said instruction is identical, step 1901 sets variable f to FFF and sets variable a to CCC, as the definition is trivially forwardable and clean at the point of its execution. Otherwise, step 1902 inspects whether the left side of x is lexically equivalent to the left side of y. Lexically equivalent means has the same structure, or same structure after algebraic rewriting. E.g., "[2*i]" and "x[i+i]" are considered lexically equivalent here, since each can be rewritten as the other. The recommended implementation is to bring all left and right sides into some canonical form before invoking the invention. The design of said canonical form is not part of the invention. If lexical equivalence does not hold, then step 1903 performs process STORE-UGLY, which is illustrated in FIG. 20. Otherwise step 1904 sets variable a to function DAA and inspects whether x is a candidate definition. If x is not a candidate definition, step 1905 sets variable f to OOO. If x is a candidate definition, step 1906 inspects whether the right sides of x and y are lexically equivalent.

If so, step 1907 inspects whether the support of x is a (possibly improper) subset of the support of y. If said canonical form is used, lexical equivalence implies that the support of x is the same as the support of y, and thus is trivially a subset. If the tests in steps 1906 and 1907 are both satisfied, then step 1908 sets variable f to FFF. Otherwise step 1909 sets variable f to MMM. After any of steps 1901, 1905, 1908 or 1909, step 1910 applies the functions specified by variables f and a to the relevant portions of $T_f$ and $T_a$ respectively by setting bis to INDICES(LHS(y)) and invoking process TRANSFER.

FIG. 20 shows a flow diagram illustrating process STORE-UGLY, which handles stores to left sides that process STORE-LHS cannot handle. The general idea is that part of the store will completely overwrite some lvalue chunks, and thus kill any definitions that were contained therein. These are the "neatly" killed chunks. The other part of the store might overwrite or partially overwrite some lvalue chunks, and thus damage but not kill definitions that were contained therein. These are the "sloppily" killed chunks. The implementation details follow. Variables g and h are set to the functions for neat and sloppy kills respectively by steps 2000 through 2002. Step 2000 checks if the store to d is a store by the left side of a definition. If so, step 2001 sets variables g and h to MMM and OMM respectively. The reason for these values is that in the worst case the kill creates a "mixed" definition, except in the case of a sloppy kill to an "outside" definition. Hence step 2001 sets g and h to the function that maps all lattice values onto value M, except that h must map value O onto O. Otherwise, step 2002 sets variables g and h both to OOO. The reason is that the kill imparts an outside influence no matter what, so the values of g and h must then be the functions that maps all lattice values onto value O. Step 2003 initializes neat and sloppy to the empty set, and initializes set bis to INDICES (LHS(y)). All three said sets are sets of vector indices. Steps 2004 through 2009 partition set bis into three sets: neat, sloppy, and an unnamed set that is ignored. Step 2004 checks if set bis is empty. While it is not empty, step 2005 chooses an arbitrary element k and removes it from set bis. Step 2006 inspects whether the lvalue chunk for k overlaps d, as indicated by said alias analysis. If not, the lvalue chunk is unaffected by the store and the value of k is ignored. Otherwise, step 2007 checks whether d not only overlaps, but also strictly contains the lvalue chunk for k. If so, step 2008 adds k to set neat; otherwise step 2009 adds k to set sloppy. After all elements have been removed from set bis, step 2010 invokes process TRANSFER for the "sloppy" kills, with variable a set to DCA, variable f set to h, and set bis set to set sloppy. In likewise fashion, step 2011 invokes process TRANSFER for the "neat" kills, with variable a set to DAA, variable f set to g, and set bis set to set neat.

Figure 21:
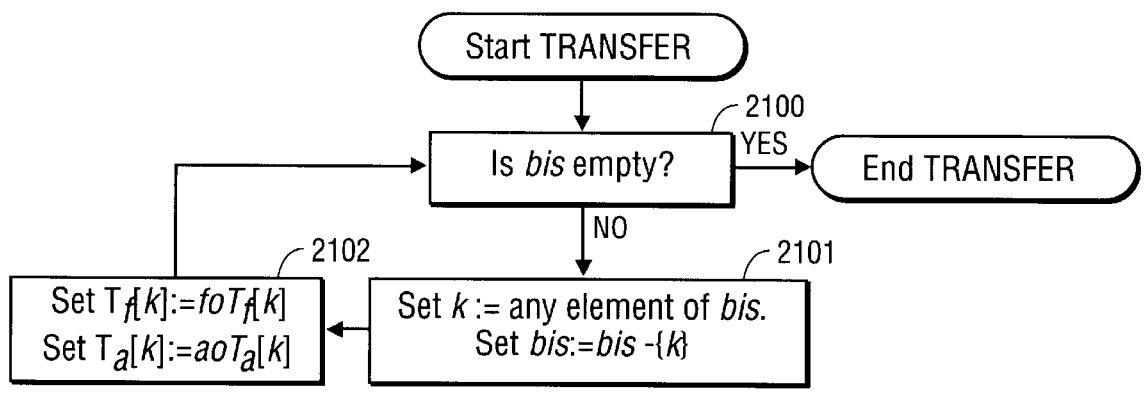
FIG. 21 is a flow chart of process TRANSFER, which accumulates transfer functions.

FIG. 21 shows process TRANSFER, which applies the functions specified by variables f and a to portions of $T_f$ and $T_a$ specified by the set bis of vector indices. Each time step 2100 determines that set bis is not empty, step 2101 removes an arbitrary vector index k from set bis. For each such index k, the functions specified by variables f and a are composed with the current contents of $T_f[k]$ and $T_a[k]$, and said contents are updated with the resulting compositions. In some data-flow frameworks, it may be advantageous to directly compute the application of the transfer functions to values rather than computing the functions themselves. In this case, merely remove step 1700 of process ANALYZE-DEF, and change step 2102 to apply f and a to the values. The net effect of said modification is merely the obvious reassociation of (h∘g)(x) into h(g(x)). Indeed, some forms of data-flow solvers will want both associations, in which case it is advantageous to make $T_f$ and $T_a$ polymorphic such that they are either vectors of functions or vectors of values, and step 2102 does the kind of update appropriate to the type of vector. Such polymorphism is well known to modern programmers.

Given said computation of transfer functions $T_f$ and $T_a$ for each instruction x by process ANALYZE-DEF (FIG. 17), a data-flow problem is constructed. The problem is to assign to each vertex v of the flow graph two solution vectors $S_f(v)$ and $S_a(v)$. The kth element of the solution vector $S_f(v)$ is denoted $S_f(v)[k]$, and is a OMF lattice value representing knowledge about the kth lvalue chunk at the program location corresponding to vertex v. The kth element of the solution vector $S_a(v)$ is denoted $S_a(v)[k]$, and is a DCA lattice value representing knowledge about the kth lvalue chunk at the program location corresponding to vertex v. The solutions must obey the following constraints. For any edge e in the graph, let w be the tail vertex of the edge and let v be the head of the edge. Let $v_0$ be the initial vertex of the flow graph that represents where execution of the program begins. Then for any vector index k corresponding to an lvalue chunk, the following four constraints must hold:

(a) $S_f(v_0)[k]$=F if the lifetime of lvalue CHUNK[k] is local to the part of the program represented by the flow graph, O otherwise.

(b) $S_a(v_0)[k]$=A.

(c) $S_f(v)[k] \leq T_f[k](S_f(w)[k])$.

(d) $S_a(v)[k] \leq T_a[k](S_a(w)[k])$

Such a solution (for any kind of data-flow problem) is called a fixed-point solution in the literature.

The constraints should be apparent to those skilled in the art of data-flow problems. Here is a rationale for the constraints. Constraint (a) pertains to initial conditions before the program begins. Before the program has begun, only non-local chunks could have been affected by outside influences, as local chunks are created after the program begins. Constraint (b) states that all definitions are absent when the program begins, as no definitions have yet been executed. Constraints (c) and (d) state that the solution must not violate information obtained by process ANALYZE-DEF.

As is common with data-flow problems, the maximal fixed-point solution is preferred. A data-flow framework is employed to solve the data-flow problem. The details of how the framework solves the data-flow problem delegated to the implementor, as many techniques of various power are known. What all these well-known techniques have in common is that the framework upon which they operate can be constructed from primitive operations that compute function application (FIG. 9), Kleene closure (FIG. 10), function meet (FIG. 11), and function composition (FIG. 12), or some subset of said primitives. Said primitive operations on lattice values and functions can employ bitwise boolean operations in accordance with FIG. 9, FIG. 10, FIG. 11, and FIG. 12, using said packing of bit vectors. A good primer on the general subject of data-flow frameworks is Chapter 8 of Advanced Compiler Design and Implementation, by Steven S. Muchnick, Copyright ©1997 by Morgan Kaufmann Publishers, Inc., Published by Morgan Kaufmann Publishers, Inc.

The solution to the data-flow problem yields the following information. If no partitioning is done, each lvalue chunk corresponds to the left side of a definition. Then for each definition of an lvalue, a location in the program is reached by the definition if $S_a(v)[k] \neq A$, where v is a vertex corresponding to a location and k is the vector index for the lvalue chunk representing the left side of the definition. For each such location reached, $S_a(v)[k]=D$ indicates that the support of the left side of the definition has changed since the most recent execution of the definition. Partitioning each left side into separate chunks (Step 301 of FIG. 3, as exemplified in FIG. 4B) and analyzing each chunk separately simply increases the accuracy of the information.

It is well known that for a "reaching definition" problem, there is usually a reverse "reaching use" problem. The method according to the present invention may be modified to solve the "reaching use" problem. The DCA value and function lattices remain the same, only their interpretation changes. Instead of being interpreted as assertions about definitions, they are interpreted as assertions about uses. The OMF value and function lattices are not used.

To find reaching uses, follow the method described by FIG. 3, with step 300 employed to construct a set of candidate uses instead of definitions. Step 301 partitions the lvalues used by the candidate uses, instead of partitioning left sides of definitions. The indices allocated for the chunks of use y are denoted INDICES(y).

Figure 22:
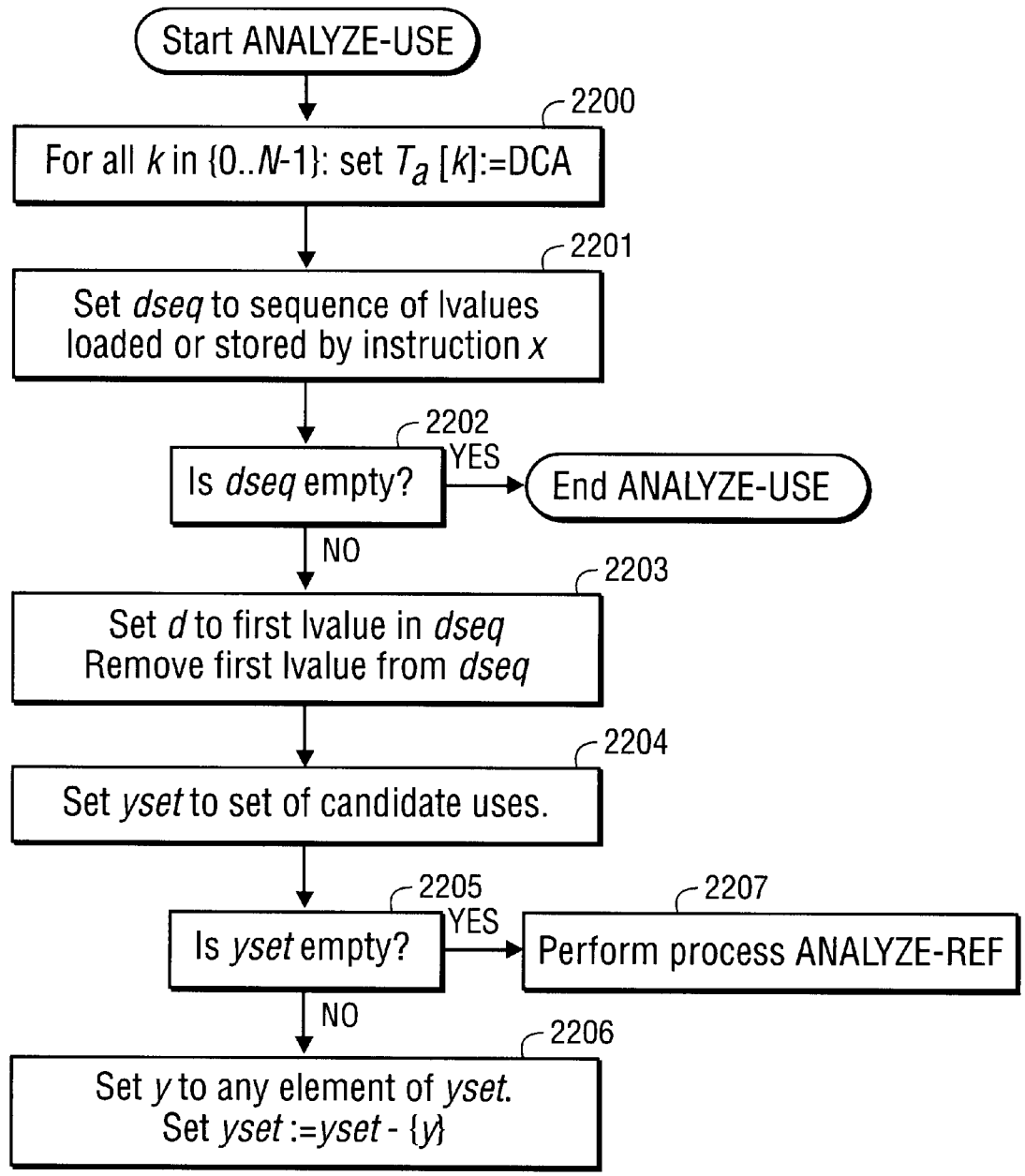
FIG. 22 is a flow chart for process ANALYZE-USE, which analyzes the effects of an instruction on candidate uses.

FIG. 22 shows a method illustrating process ANALYZE-USE for computing the transfer function $T_a$ corresponding to an instruction x. Process ANALYZE-USE is called when the transfer function for each instruction needs to be computed (step 303 of FIG. 3). Step 2200 sets all elements of vector $T_a$ to the identity function DCA. The sequence dseq is set to the sequence of lvalues loaded or stored by instruction x, in reverse order of their occurrence. Notice that unlike for FIG. 17, sequence dseq includes loads as well as stores. Then step 2203 removes each lvalue d from sequence dseq. Step 2204 assigns to set yset the set of candidate uses (from step 300 in FIG. 3). The rest of the steps remove each use from yset and in turn and analyze the effect on it by the reference to lvalue d. Step 2205 checks whether yset is empty, and if not empty, step 2206 removes any definition y from yset, and step 2207 invokes process ANALYZE-REF. Process ANALYZE-REF is described in detail in conjunction with FIG. 23.

Figure 23:
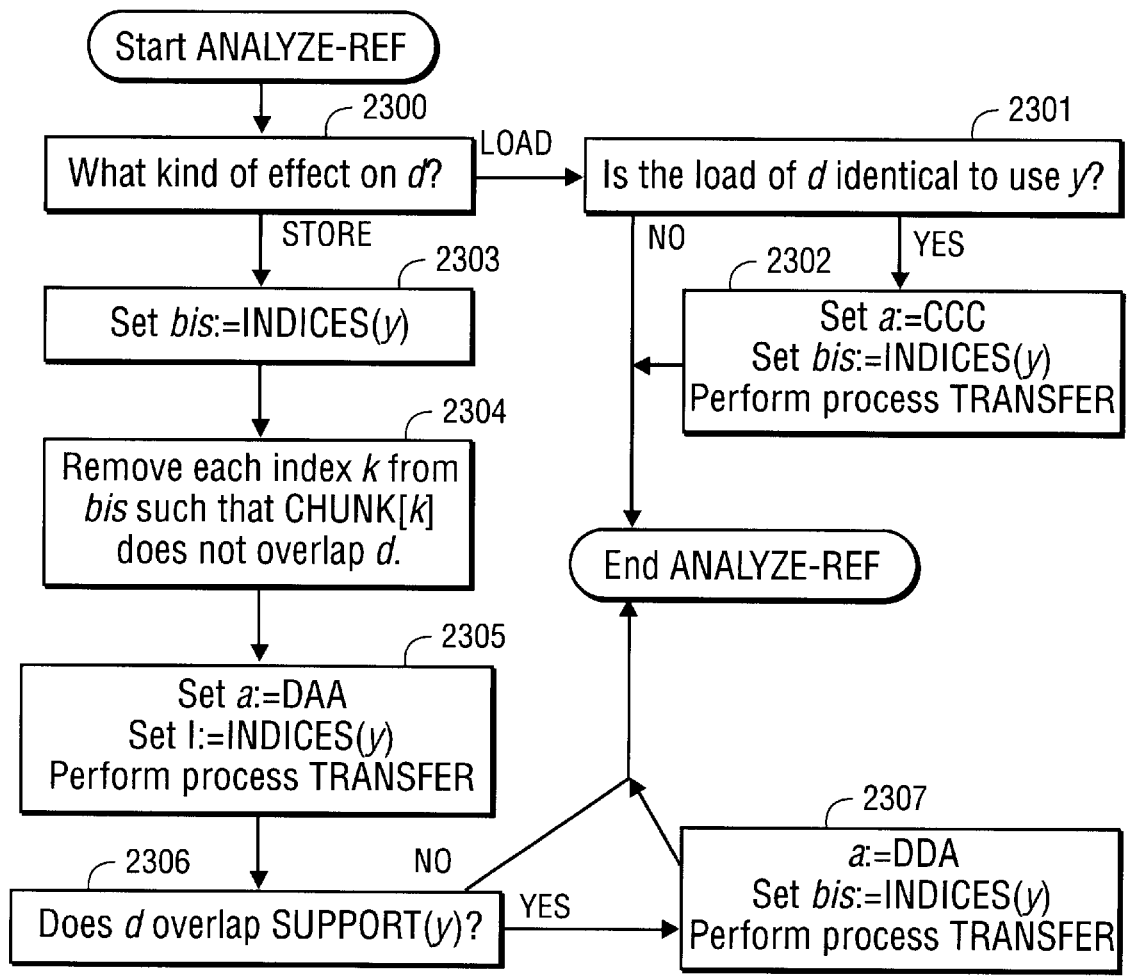
FIG. 23 is a flow chart for process ANALYZE-REF, which is a subprocess of process ANALYZE-USE.

FIG. 23 is a flow diagram illustrating process ANALYZE-REF, which updates $T_a$ to reflect the effect of the load or store to an lvalue d on a use y. Step 2300 tests whether the effect on lvalue d is a load. If so, step 2301 checks if the load of d is identical to the use y. If so, step 2302 sets variable a to CCC, sets bis to INDICES(y), and invokes process TRANSFER. If the effect on lvalue d is a store, step 2303 sets bis to INDICES(y). Then step 2304 removes each index k from bis such that CHUNK[k] does not overlap d. The point of this step is to avoid loss of information for chunks that really are not affected by the store. Notice that often d and y will be disjoint, and hence bis will end up empty after step 2304. Then step 2305 sets variable a to DAA, sets bis to INDICES(y), and performs process TRANSFER. Step 2306 checks if d overlaps the support of y. If so, then the reaching use does not reach cleanly, and step 2307 records this fact by setting variable a to DDA, setting bis to INDICES(y), and performing process TRANSFER. Note that since the OMF lattice is not employed for the reaching uses problem, operations on $T_f$ by process TRANSFER (FIG. 21) should be omitted.

Given said computation of transfer function $T_a$ for each instruction x by process ANALYZE-USE (FIG. 22), a data-flow problem is constructed. The problem is to assign to each vertex w of the flow graph a solution vector $S_a(w)$. Each solution vector $S_a(w)[k]$ is a DCA lattice value representing knowledge about the kth lvalue chunk at the program location corresponding to vertex v. The solutions must obey the following constraints. For any edge e in the graph, let w be the tail vertex of the edge and let v be the head of the edge. Let $w_0$ be the final vertex of the flow graph that represents where execution of the program ends. Then for any vector index k corresponding to an lvalue chunk, the following two constraints must hold:
(a) $S_a(w_0)[k]=A$ if the lifetime of lvalue CHUNK[k] is local to the part of the program represented by the flow graph; otherwise
(b) $S_a(w_0)[k]=C$ if (a) does not apply and the support of lvalue CHUNK[k] is known not to change once the part of the program represented by the flow graph is exited.
(c) $S_a(w_0)[k]=D$ if neither (a) nor (b) apply.
(d) $S_a(w)[k] \leq T_a[k](S_a(v)[k])$.

Notice that since this is a backwards data-flow problem, the roles of head and tails of edges is reversed from that of the earlier described forwards-flow problem.

The constraints should be apparent to those skilled in the art of data-flow problems. Here is a rationale for the constraints. Constraints (a)–(c) pertain to final conditions beyond the part of the program represented by the flow graph. Constraint (d) states that the solution must not violate information obtained by process ANALYZE-USE.

The solution to the backward data-flow problem yields the following information. If no partitioning is done, each lvalue chunk corresponds to a use. Then for each use of an lvalue, a location in the program is reached backwards by the use if $S_a(w)[k] \neq A$, where w is a vertex corresponding to a location and k is the vector index for the lvalue chunk representing the use. For each such location reached, $S_a(w)[k]=D$ indicates that the support of the use will change before the next execution of the use. Partitioning each use into separate chunks (Step 301 of FIG. 3) and analyzing each chunk separately simply increases the accuracy of the information.

The method according to the present invention may be extended to consider the actions of creation or destruction of an lvalue when computing the transfer functions. In either case, the lvalue becomes undefined, and any definitions of it become "absent" and "mixed" (not forwardable). If part of the support of the left side of a definition becomes undefined, then the associated transfer functions are DDA and OMM, as the definition is dirtied unless absent, and certainly no longer forwardable. If the support of the right side of a definition becomes undefined, then the associated transfer functions are DCA and OMM, as the definition's DCA-lattice value is unaffected, but it is no longer forwardable.

A method in accordance with the present invention is faster than prior art because it applies a single framework that simultaneously tracks whether a definition reaches, and whether its support has changed. Like prior art, it handles aggregates by dividing them into chunks, but requires fewer bits per chunk. For a definition partitioned into n chunks, the solver requires 4n and 6n bits respectively to represent the lattice values and functions. Said factor of 4 arises from the 2 bits required to represent a DCA lattice value and the 2 bits required to represent an OMF lattice value, which is a total of 4 bits. Said factor of 6 comes from the 3 bits required to represent a DCA lattice function and the 3 bits required to represent a OMF lattice function, which is a total of 6 bits. Though the 4n is slightly worse than the 3n+6 for prior art when n>6, it is much better in the common case of optimizing scalar variables, for which n=1. Despite a significantly more complicated lattice formulation, the framework is still implemented via classical bit-vector techniques.

The method in accordance with the present invention greatly improves over the prior art in accuracy, making possible optimizations that were previously missed. For instance, in the problem posed by FIG. 1, the method of the present invention computes that definitions 100 and 101 are forwardable into the use by "q=p", since the solution at the tail of the latter's arrow, the OMF part of the solution is F. In the problem posed by FIG. 2, the method of the present invention computes that definition 200 is cleanly killed by definitions 201 along paths that include definition 201, and thus it reaches cleanly at the tail of the edge with definition 202, which cleanly kills it too. The classical algorithm for finding dead stores by taking the complement of the transitive closure of live stores is simply extended by considering a definition to reach if any lvalue chunk reaches, dirtily or cleanly.

Any optimization that employs traditional definition-use, use-definition, use-use, or definition-definition information can be extended to arbitrary lvalues by employing the more general analysis of the present invention. The extensions come in two flavors. The first extension is to aggregates, and this is straightforwardly done by examining the solution to the data-flow problem for each lvalue chunk of interest. The extension to lvalues with non-constant addressing expressions is more complicated, because the present invention introduces two flavors of reaching definitions: those that reach cleanly, i.e. their left-side support has not changed, and those that reach dirtily, i.e. their left-side support has changed.

The extension of some optimizations will obviously require that definitions reach cleanly for best effect. For example, the method of replacing lvalues by variables described by U.S. Pat. No. 5,710,927, assigned to the assignee of the present application, computes least-general-unifiers (LGU) for definition-use information. When a definition reaches a use cleanly, the LGU can be as narrow as the use, but when a definition reaches dirtily, the LGU must be as wide as the outermost lvalue that contains the definition's left side.

Predicated analyses of traditional simple scalar variables can be extended to predicated analyses of arbitrary lvalues by employing features of the present invention.

The method for compact encoding of lattice values has application wherever the meet or join of lattice values need be computed, and space is at a premium.

I claim:

1. A method comprising:
   constructing a data-flow framework in a computer executable program;
   using the data-flow framework to compute, for each definition of an lvalue, one or more locations in the program reached by the definition;
   using the data-flow framework to determine, for each location reached by a definition, whether support of a left side of the definition has changed since the most recent execution of the definition; and
   solving a data-flow problem with the data-flow framework.

2. The method of claim 1, further comprising:
   partitioning each left side into separate chunks; and
   analyzing each chunk separately.

3. The method of claim 1, wherein the data-flow framework employs a lattice that distinguishes whether
   (A) a definition cannot reach a location;
   (B) a definition might reach a location and its left-side support has not changed since the most recent execution of the definition; or
   (C) a definition might reach a location and its left-side support might have changed since the most recent execution of the definition.

4. The method of claim 3, wherein functions on the lattice are encoded as binary numerals.

5. The method of claim 4, wherein functions on the lattice form a function lattice, and the functions are encoded by binary numerals chosen by a method comprising:
   embedding the function lattice as a sublattice of a hypercube lattice;
   assigning codes corresponding to the hypercube lattice;
   shortening the codes by removing bit positions;
   making the shortened codes unique by complementing some bits; and
   assigning the unique codes to represent the elements of the function lattice.

6. The method of claim 5, wherein operations on the lattice values and functions employ bitwise boolean operations.

7. The method of claim 3 employing an additional lattice that distinguishes whether
   (A) the definition can be forward substituted at a location;
   (B) the definition cannot be forward substituted at a location but is not corrupted by part of the program that is not a definition; or
   (C) the definition is corrupted by part of the program that is not a definition.

8. The method of claim 7 wherein the encodings of values for the two lattices share the same words of storage and the encodings of functions on the two lattices share the same words of storage.

9. The method of claim 8, wherein operations on the two lattices are computed with the same bitwise boolean operations.

10. A method comprising:
    constructing a data-flow framework in a computer executable program;
    using the data-flow framework to identify, for each use of an lvalue, locations in the program where the use reaches backwards in the program;
    using the data-flow framework to determine, for each such location in the program, whether support of the use will change before the next execution of the use; and
    solving a data-flow problem with the data-flow framework.

11. A method for choosing binary codes to encode elements of a lattice fixed in a machine readable data-flow framework, comprising:
    embedding the lattice as a sublattice of a hypercube lattice;
    assigning codes corresponding to the hypercube lattice;
    shortening the codes by removing bit positions;
    making the shortened codes unique by complementing some bits; and
    assigning the unique codes to represent the lattice elements.

12. A method comprising:
    (A) constructing a set of candidate definitions;
    (B) partitioning a left-side lvalue of each definition into separate chunks;
    (C) constructing a data-flow framework that employs
        (i) a value lattice that distinguishes for a chunk of a definition and a location whether
            (a) a chunk of the definition cannot reach the location, (b) the chunk of the definition might reach the location and the support of its left side has not changed, or (c) the chunk of the definition might reach the location and the support of its left side might have changed; and (ii) another value lattice that distinguishes for a chunk of a definition and location whether (a) a chunk of the definition cannot reach the location, (b) the chunk of the definition might reach the location and the support of its left side has not changed, or (c) the chunk of the definition might reach the location and the support of its left side might have changed; and (iii) representation of lattice functions on the two lattices; and (iv) computation of operations on the lattice values and functions using bitwise boolean operations; and (D) constructing a data-flow problem within the data-flow framework, comprising constructing a transfer function for each instruction in the program, wherein each transfer function is an array of lattice functions with one function per element of the array, where one of more array elements are packed into bit vectors; and (E) solving the data-flow problem by using the data-flow framework.

13. A method comprising:

computing a storage location in a computer program, the contents of the storage location, and all values that affect the contents;

using a single data-flow analyzer to determine if the contents of the storage location are read by the computer program, and, if read, using the analyzer to determine whether all the values that affect the contents have changed; and utilizing the single data-flow analyzer to solve a data-flow problem.

14. The method of claim 13, wherein the single data-flow analyzer constructs transfer functions and uses the transfer functions to construct the data-flow problem.

15. The method of claim 14, wherein each transfer function is an array of lattice functions with one function per element of the array.

16. The method of claim 15, wherein array elements are packed into bit vectors.

* * * * *

UNITED STATES PATENT AND TRADEMARK OFFICE
CERTIFICATE OF CORRECTION

PATENT NO. : 6,370,685 B1  Page 1 of 1
DATED : April 9, 2002
INVENTOR(S) : Robison It is certified that error appears in the above-identified patent and that said Letters Patent is hereby corrected as shown below:

<u>Column 16,</u>
Line 15, delete "method of claim 5" and insert -- method of claim 4 --.

Signed and Sealed this

Twenty-ninth Day of October, 2002

Attest:

Attesting Officer

JAMES E. ROGAN
*Director of the United States Patent and Trademark Office*